(12) United States Patent
Yamazaki

(10) Patent No.: US 9,212,682 B2
(45) Date of Patent: Dec. 15, 2015

(54) FASTENING MEMBER

(71) Applicant: KABUSHIKI KAISHA YAMAZAKI ACTIVE, Nagano (JP)

(72) Inventor: Tadayoshi Yamazaki, Nagano (JP)

(73) Assignee: Kabushiki Kaisha Yamazaki Active, Nagano (JP)

(*) Notice: Subject to any disclaimer, the term of this patent is extended or adjusted under 35 U.S.C. 154(b) by 0 days.

(21) Appl. No.: 14/367,834

(22) PCT Filed: Dec. 20, 2012

(86) PCT No.: PCT/JP2012/083027
§ 371 (c)(1),
(2) Date: Jun. 20, 2014

(87) PCT Pub. No.: WO2013/094672
PCT Pub. Date: Jun. 27, 2013

(65) Prior Publication Data
US 2015/0016920 A1    Jan. 15, 2015

(30) Foreign Application Priority Data

Dec. 22, 2011 (JP) ................. 2011-281019
Jun. 27, 2012 (JP) ................. 2012-143978

(51) Int. Cl.
| | |
|---|---|
| F16B 19/00 | (2006.01) |
| F16B 33/00 | (2006.01) |
| F16B 35/06 | (2006.01) |
| F16B 37/00 | (2006.01) |
| F16B 39/284 | (2006.01) |

(Continued)

(52) U.S. Cl.
CPC ............. *F16B 33/00* (2013.01); *B23K 20/129* (2013.01); *F16B 5/0241* (2013.01); *F16B 35/06* (2013.01); *F16B 37/00* (2013.01); *F16B 39/284* (2013.01)

(58) Field of Classification Search
CPC ........ F16B 33/00; F16B 5/0241; F16B 35/06; F16B 39/284; F16B 37/00; B23K 20/129
USPC ...................... 411/366.1, 383, 396
See application file for complete search history.

(56) References Cited

U.S. PATENT DOCUMENTS 1,139,479 A * 5/1915 Brightman ............... 470/11
3,924,508 A * 12/1975 DeCaro ................... 470/11

(Continued)

FOREIGN PATENT DOCUMENTS

| JP | 50-77650 A | 7/1975 |
| JP | 55-130387 A | 10/1980 |

(Continued)

*Primary Examiner* — Gary Estremsky
(74) *Attorney, Agent, or Firm* — Muncy, Geissler, Olds & Lowe, P.C.

(57) ABSTRACT

A fastening member for appropriately ensuring strength of a peripheral edge part of a tapered-ring-body-shaped part and appropriately reducing external dimensions. A bolt, a nut or a washer employed for fastening a body is fastened by a screw tightening action The fastening member has a tapered-ring-body-shaped part formed into a ring body shape with a gradually increasing diameter toward a seating surface formed into a circular-planar-band-ring-shape concentric with an axis so as to press against the body being fastened. The taper angle of the tapered-ring-body-shaped part is an acute angle, and an upright surface is formed on an outer circumferential surface of the tapered-ring-body-shaped part and vertically erected from the body being fastened.

7 Claims, 15 Drawing Sheets

(51) Int. Cl.
  *F16B 5/02* (2006.01)
  *B23K 20/12* (2006.01)

(56) References Cited

U.S. PATENT DOCUMENTS

| | | | | |
|---|---|---|---|---|
| 4,321,001 A | * | 3/1982 | Gruich | 411/396 |
| 5,697,746 A | * | 12/1997 | Brown et al. | 411/396 |
| 2003/0007844 A1 | | 1/2003 | Terry | |

FOREIGN PATENT DOCUMENTS

| | | |
|---|---|---|
| JP | 59-141217 U | 9/1984 |
| JP | 61-89513 U | 6/1986 |
| JP | 1-176808 A | 7/1989 |
| JP | 3165929 U | 2/2011 |
| JP | 2012-87853 A | 5/2012 |
| WO | WO 2004/015285 A1 | 2/2004 |
| WO | WO 2008/136109 A1 | 11/2008 |

* cited by examiner

FASTENING MEMBER

FIELD OF THE INVENTION

The present invention relates to a fastening member such as a locking bolt having a tapered-cylindrical-body-shaped part, which is concentric with a bolt shaft, whose diameter is gradually increased from a bolt head and whose end surface contacts a body being fastened as a seating surface, a locking nut having a tapered-cylindrical-body-shaped part, which is concentric with a shaft of a bolt to be screwed, whose diameter is gradually increased from a head of the nut and whose end surface contacts a body being fastened as a seating surface, or a washer used with the locking bolt or the locking nut.

BACKGROUND OF THE INVENTION

Fastening members such as bolts and nuts are used in various fields so as to fasten and fix materials and parts.

In case that impact and vibration are repeatedly applied to a fastened part fastened by a fastening member, the fastened part will be loosened, thus a modified fastening member having a following structure has been provided.

The fastening member, which fastens a body being fastened by a screw tightening action, comprises: a head section being used to turn the fastening member about an axial line; and a tapered section being concentrically integrated with the head section, extended from a base part of the head section and formed into a cylindrical shape whose diameter is gradually increased toward an extension end and made greater than that of the head section, an inner surface of the tapered section is a cone curved surface, and an outer surface of the tapered section is a concave-curved surface (see Patent Document 1). With this structure, violent vibration and impact can be absorbed, so that the body being fastened can be securely fixed without being loosened.

The fastening members (including washers) such as the above described bolt and nut (hereinafter referred to as "bolt, etc.") have a common locking structure, e.g., the tapered section (tapered-cylindrical-body-shaped part). A tapered-cylindrical-body-shaped part of a locking nut can be produced by a dedicated machine (e.g., parts former), so it can be inexpensively produced. On the other hand, the tapered-cylindrical-body-shaped part of the locking bolt is produced by metal cutting work, so a production cost must be increased and mass production cannot be performed.

In the tapered-cylindrical-body-shaped part of the fastening member disclosed in Patent Document 1, the entire outer surface of the tapered section is formed into the concave-curved surface, so a peripheral edge part cannot have enough strength and external dimensions cannot be appropriately reduced.

Further, if a ring-width of the ring-shaped seating surface contacting the body being fastened is narrow, sufficient frictional resistance between the seating surface and the body being fastened cannot be obtained, and impact and vibration caused by the body being fastened and tightening force of the bolt, etc. exceed elastic force of the tapered-cylindrical-body-shaped part, therefore the tapered-cylindrical-body-shaped part will be plastic-deformed.

PRIOR ART DOCUMENT

Patent Document 1: Japanese Patent No. 3860200 (claims)

SUMMARY OF THE INVENTION

Problems to be Solved by the Invention

Problems of the fastening member such as the locking bolt are that firstly the strength of the peripheral edge part of the tapered-cylindrical-body-shaped part cannot be appropriately ensured and the external dimensions cannot be appropriately reduced, that secondly impact and vibration caused by fastening force of the bolt, etc. and the body being fastened cannot be appropriately absorbed without causing plastic deformation, and that thirdly the locking bolt having the tapered-cylindrical-body-shaped part, which is concentric with the bolt shaft and whose diameter is gradually increased from the bolt head, cannot be inexpensively mass-produced.

Objects of the present invention are: firstly providing a fastening member, in which strength of a peripheral edge part of a tapered-cylindrical-body-shaped part can be appropriately ensured and external dimensions can be appropriately reduced; secondly providing a fastening member, in which impact and vibration caused by fastening force of a bolt, etc. and a body being fastened can be appropriately absorbed without causing plastic deformation; and thirdly providing a locking bolt, which has a tapered-cylindrical-body-shaped part concentric with a bolt shaft and whose diameter is gradually increased from a bolt head and which can be inexpensively mass-produced.

Means for Solving the Problems

To achieve the objects, the present invention has following structures.

In the present invention, the fastening member, such as a bolt, a nut or a washer employed for fastening a body being fastened by a screw tightening action, comprises a tapered-cylindrical-body-shaped part, which is formed into a cylindrical body shape with a gradually increasing diameter toward a seating surface formed into a circular-planar-band-ring-shape concentric with an axis so as to press against the body being fastened, the taper angle of the tapered-cylindrical-body-shaped part is an acute angle, and an upright surface is formed in an outer circumferential surface of the tapered-cylindrical-body-shaped part and vertically erected from the body being fastened, so that an outer diameter of the circular-planar-band-ring-shaped seating surface has a size in a range for creating a surface pressure from the seating surface so as to effectively press against the body being fastened.

In the fastening member, the outer circumferential surface of the tapered-cylindrical-body-shaped part may include the upright surface and a concave-curved surface, which is connected to the upright surface, a thickness of the tapered-cylindrical-body-shaped part may be made entirely equal or gradually increased from a part where the diameter increase begins to a part where the concave-curved surface and the upright surface are connected, and the thickness between the concave-curved surface and the upright surface may be determined, according to an erection length of the upright surface, so as to receive a tightening force of a bolt and an impact and vibration from the body being fastened without being plastic-deformed.

In the fastening member, an inner circumferential surface of the tapered-cylindrical-body-shaped part may include a concave-curved surface.

In the present invention, a locking bolt comprises a tapered-cylindrical-body-shaped part, which is integrated with a bolt head and concentrically encloses a bolt shaft and whose diameter is gradually increased, the tapered-cylindrical-body-shaped part having an end surface, which acts as a seating surface formed into a circular-planar-band-ring-shape concentric with an axis of the bolt shaft and which contacts a body being fastened, and a shaft member of the bolt is separated from a head member thereof, which is constituted by the bolt head and the tapered-cylindrical-body-shaped part and in which a short-columnar-projected part is formed in an inner bottom part of the head, enclosed by the tapered-cylindrical-body-shaped part and has an end surface acting as a bonding surface of friction welding and in which a protruded part of a friction-welded section protruded by the friction welding can be accommodated in a space between an outer circumferential surface of the projected part and the inner circumferential surface of the tapered-cylindrical-body-shaped part; the shaft member and the head member are bonded by the friction welding; and the friction-welded section is annealed.

In the locking bolt, the bonding surface of the projected part formed in the inner bottom part of the bolt head and a bonding surface of the bolt shaft may be formed into a same shape.

In the locking bolt, a taper angle of the tapered-cylindrical-body-shaped part may be an acute angle, and an upright surface may be formed in an outer circumferential surface of the tapered-cylindrical-body-shaped part and vertically erected from the body being fastened, so that an outer diameter of the circular-planar-band-ring-shaped seating surface has a size in a range for creating a surface pressure from the seating surface so as to effectively press against the body being fastened.

In the locking bolt, the outer circumferential surface of the tapered-cylindrical-body-shaped part may include the upright surface and a concave-curved surface, which is connected to the upright surface, a thickness of the tapered-cylindrical-body-shaped part may be made entirely equal or gradually increased from a part the bolt head where the diameter increase begins to a part where the concave-curved surface and the upright surface are connected, and the thickness between the concave-curved surface and the upright surface may be determined, according to an erection length of the upright surface, so as to receive a tightening force of the bolt and an impact and vibration from the body being fastened without being plastic-deformed.

Further, in the locking bolt, an inner circumferential surface of the tapered-cylindrical-body-shaped part may include a concave-curved surface.

Effects of the Invention

In the locking bolt of the present invention, firstly strength of a peripheral edge part of the tapered-cylindrical-body-shaped part can be appropriately ensured and external dimensions can be appropriately reduced, secondly impact and vibration caused by fastening force of the bolt, etc. and the body being fastened can be appropriately absorbed without causing plastic deformation, and thirdly the locking bolt, which has the tapered-cylindrical-body-shaped part concentric with the bolt shaft and whose diameter is gradually increased from the bolt head, can be efficiently produced.

EMBODIMENTS OF THE INVENTION

Preferred embodiments of a locking bolt (a method of producing a locking bolt) relating to the present invention will now be described in detail with reference to the accompanying drawings (FIGS. 1-7).

Figure 31:
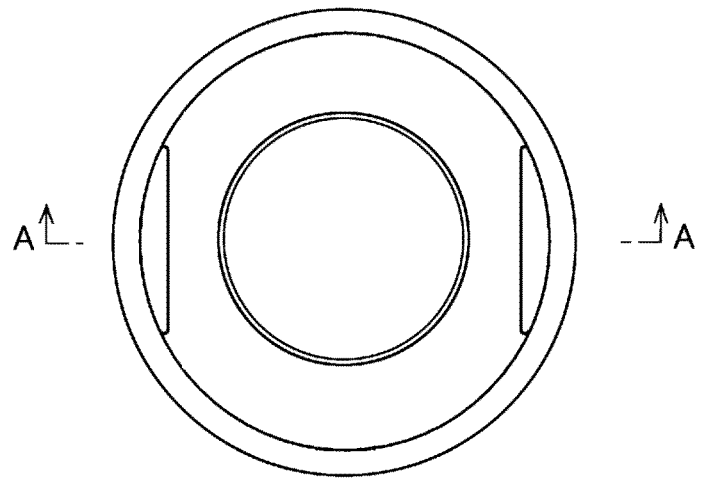
FIG. 31 is a front plan of the locking washer shown in FIG. 26.
Figure 32:
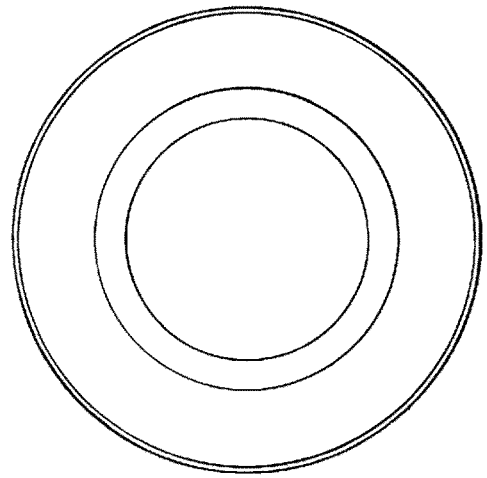
FIG. 32 is a bottom view of the locking washer shown in FIG. 26.
Figure 33:
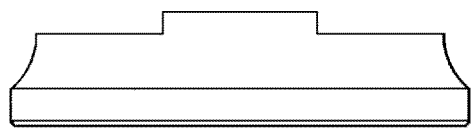
FIG. 33 is a side view of the locking washer shown in FIG. 26.
Figure 34:
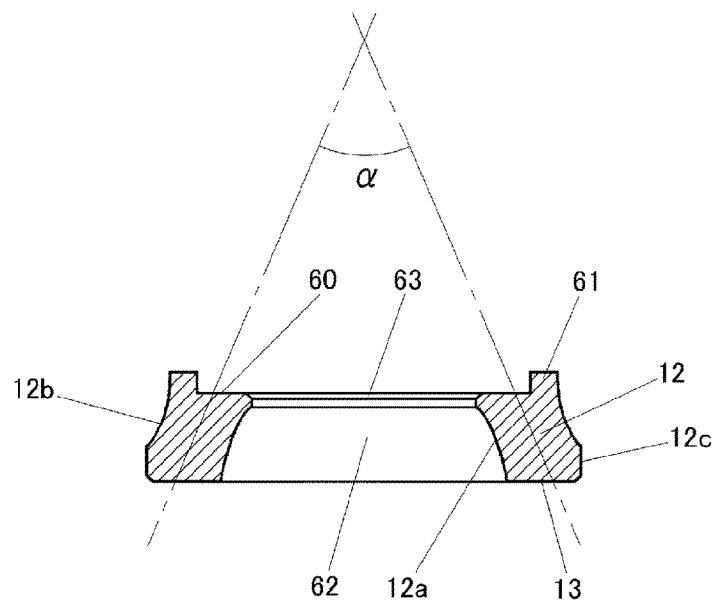
FIG. 34 is a bottom view of the locking washer shown in FIG. 26 taken along a line A-A.

The locking bolt of the present embodiment includes a tapered-cylindrical-body-shaped part 12, which is integrated with a bolt head 11 and formed into a cylindrical body shape to enclose a bolt shaft 21 and whose diameter is gradually increased toward an end surface 13 formed into a circular-planar-band-ring-shape concentric with the bolt shaft 21 and capable of contacting a body 40 being fastened (see FIG. 14) as a seating surface, an inner surface 12a of the tapered-cylindrical-body-shaped part 12 is a cone curved surface, and an outer surface 12b of the tapered-cylindrical-body-shaped part 12 is a concave-curved surface. Note that, the taper angle α of the tapered-cylindrical-body-shaped-part 12 is an acute angle (see FIG. 31). Further, the bolt shaft and the seating surface having the circular-planar-band-ring-shape concentric with the shaft are separated by a prescribed distance.

In the present invention, firstly a shaft member 20 of the shaft 21 and a head member 10, which is constituted by the head 11 and the tapered-cylindrical-body-shaped part 12 and in which a short-columnar-projected part 15a is formed in an inner bottom part 15 of the head 11 enclosed by the tapered-cylindrical-body-shaped part 12 and has an end surface acting as a bonding surface for friction welding, are produced as separate parts. The head member 10 and the shaft member 20 can be easily produced, as separate parts, by a conventional method for producing a screw (fastening member).

The shaft member 20 and the head member 10 are bonded by friction welding (see FIG. 2), and the friction-welded section 16 is annealed. A tensile test of the locking bolt 10 produced by the above described method was carried out, and it was confirmed that the friction-welded section 16 had enough strength. In the tensile test, no plastic deformation was observed in the bolt shaft 21, and the friction-welded section 16 was not cut and broken.

In comparison with a method in which the tapered-cylindrical-body-shaped part is formed by cutting work or hammering work, the tapered-cylindrical-body-shaped part 12 having a sufficiently-long axial length (depth) can be easily produced, at low cost, by the above described method for producing the locking bolt 10.

Note that, the above described friction welding is a technology for bonding metals to each other by using frictional heat. The friction welding is performed by the steps of: butting two metal materials; relatively rotating the materials; and applying thrust force so as to generate frictional heat in the contact surfaces. The contact surfaces and their periphery are softened by the frictional heat, and then the relative rotation is stopped when the temperature reaches a temperature for frictional welding and the thrust force is increased to bond the metal materials.

Figure 2:
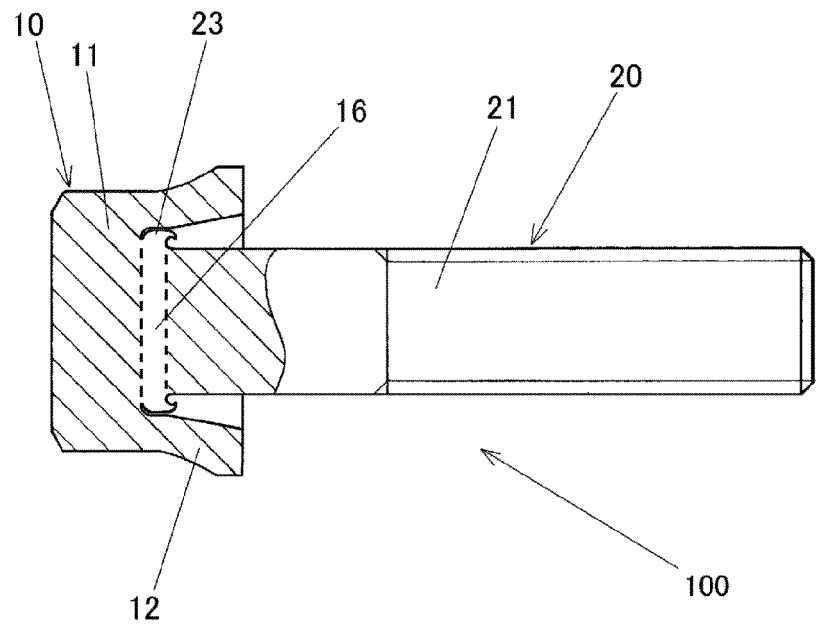
FIG. 2 is a sectional view of the completed locking bolt relating to the present invention.
Figure 3:
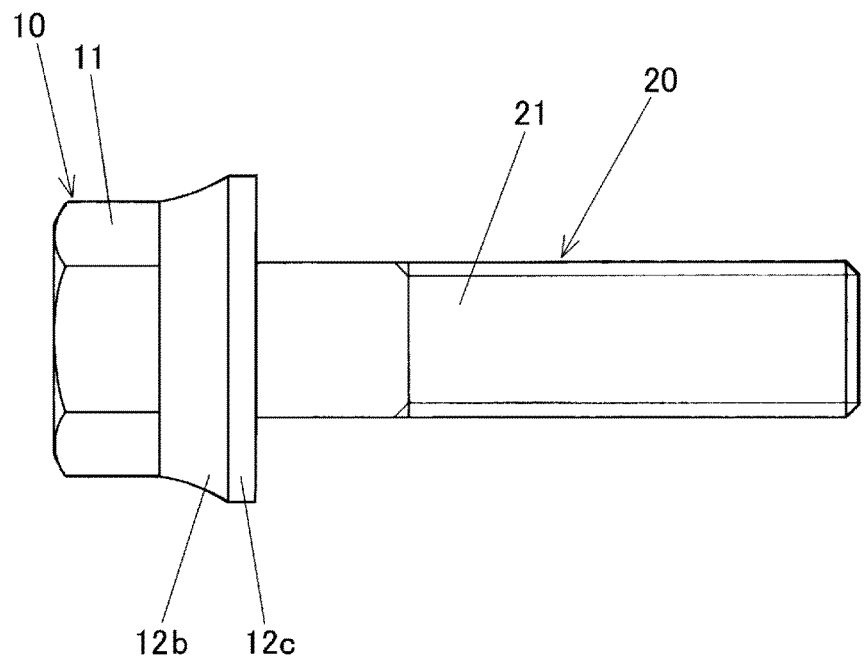
FIG. 3 is a side view of the locking bolt shown in FIG. 2.
Figure 4:
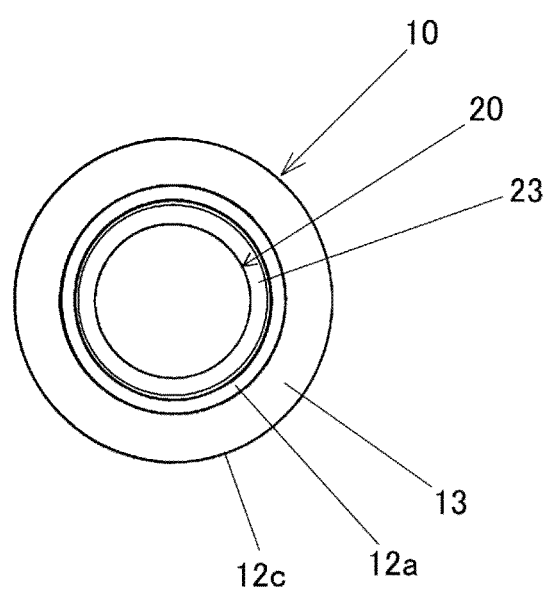
FIG. 4 is an end view of the locking bolt shown in FIG. 2, which is seen from an end of a bolt shaft.
Figure 5:
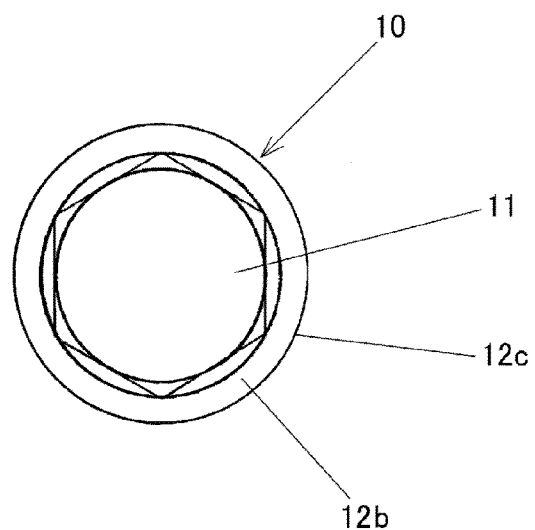
FIG. 5 is an end view of the locking bolt shown in FIG. 2, which is seen from a bolt head.

There is a possibility that the frictional heat is conducted to the tapered-cylindrical-body-shaped part 12 and the tapered-cylindrical-body-shaped part 12 is softened and deformed. Thus, in the present embodiment, a protruded part 23 (see FIG. 2) of the friction-welded section 16, which is softened and protruded by the frictional heat, can be accommodated in a space, which is formed in the inner bottom part 15 and between an outer circumferential surface 15b of the projected part 15a and the inner circumferential surface 12a of the tapered-cylindrical-body-shaped part. Since the protruded part 23 is accommodated in the space, an external appearance of the bolt 100 seen from the shaft side is not disfigured. The protruded part 23 is protruded from the contact surfaces of the head member and the shaft member and curled. An outer edge of the projected part 15a is chamfered, so that the protruded part 23 can be appropriately moving there around. By appropriately forming the protruded part 23, an area of the bonded section (the friction-welded section 16) can be appropriately increased as shown in FIG. 2, so that bonding strength can be enhanced.

Figure 1:
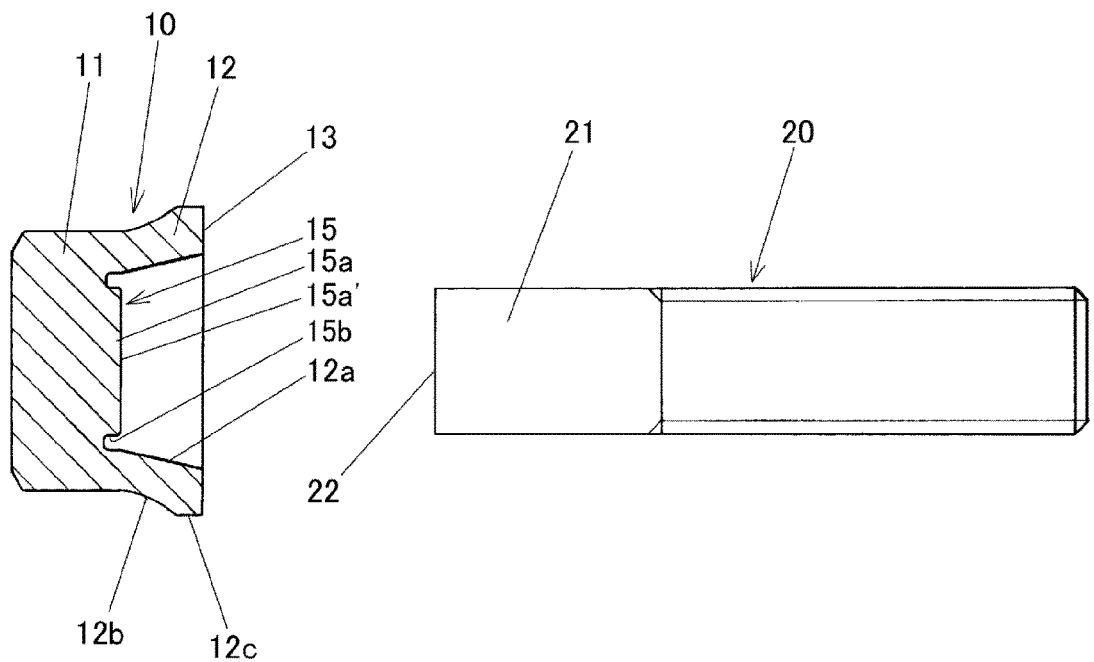
FIG. 1 is a sectional view of a locking bolt relating to the present invention, which shows a production method of the locking bolt.

In the embodiment shown in FIG. 1, the bonding surface 15a' of the projected part 15a, which is formed in the inner bottom part 15 of the bolt head 11 and which is enclosed by the tapered-cylindrical-body-shaped part 12 of the head member 10, is formed into a flat surface, and a bonding surface 22 of the bolt shaft 21, which is friction-welded to the bonding surface 15a', is also formed into a flat surface.

Therefore, the head member 10 and the shaft member 20 have the simple shapes and can be easily produced, the tapered-cylindrical-body-shaped part 12 has enough depth to improve the locking function, solid-phase diffusion bonding of the members performed by friction welding can be appropriately performed, and the locking bolt having prescribed functions and strength can be appropriately produced at low cost.

In the present embodiment, the bonding surface 15a' of the projected part 15a formed in the inner bottom part 15 and the bonding surface 22 of the bolt shaft 21 have a same shape and a same diameter. Since the bonding surfaces have the same shape, the heat generated by the friction welding is spread with balance and the bonding can be appropriately performed.

In the present embodiment, the inner circumferential surface 12a of the tapered-cylindrical-body-shaped part 12 is the cone curved surface, and an outer surface of the tapered-cylindrical-body-shaped part 12 includes the upright surface 12c, which is substantially vertically erected from the body 40 being fastened, and the concave-curved surface 12b, which is continuously formed from the upright surface. Since the upright surface 12c and the concave-curved surface 12b are continuously formed, strength of a peripheral edge part of the tapered-cylindrical-body-shaped part 12 on the seating surface 13 side can be appropriately secured. If a size of the upright surface 12c is equal to or greater than a thickness of a washer, enough strength can be obtained. Namely, a thick portion enclosed by the upright surface 12c and the inner circumferential surface 12a can receive impact or vibration applied from the body 40 being fastened to the seating surface 13 without being plastic-deformed. Further, the received impact or vibration is conducted to the concave-curved surface 12b, which is continuously formed from the upright surface 12c, and bends the concave-curved surface 12b. Therefore, turning the locking bolt 100 is restrained, so that loose of the locking bolt can be prevented. Namely, the tapered-cylindrical-body-shaped part 12 is appropriately plastic-deformed by a tightening force, and elastic stress generated by the plastic deformation absorbs the impact and vibration, so that loose of the locking bolt can be appropriately prevented. The thickness of the tapered-cylindrical-body-shaped part 12 is made equal or gradually increased from a part of the head 11 where the diameter increase begins to a part where the concave-curved surface 12b and the upright surface 12c are connected, so that the thick portion between the upright surface 12c and the concave-curved surface 12b acts like a washer and prevents loose of the locking bolt, and external dimensions can be appropriately reduced.

Figure 6:
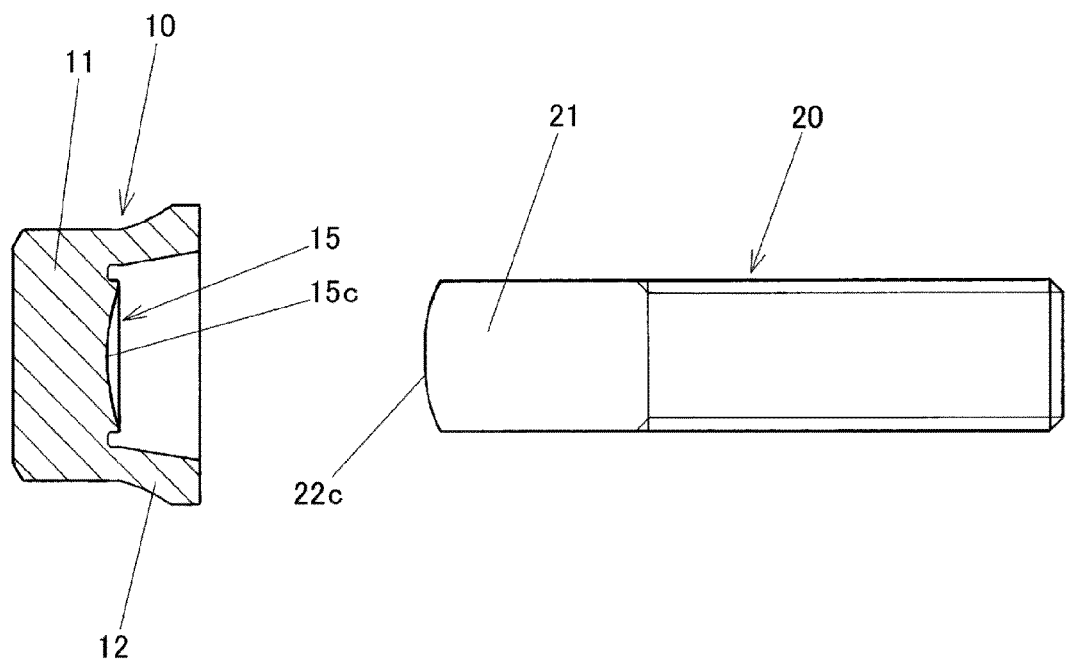
FIG. 6 is a sectional view of the locking bolt relating to the present invention, which explains another production method.

In an embodiment shown in FIG. 6, a bonding surface 15c of the projected part, which is formed in the inner bottom part 15 of the bolt head 11 and which is enclosed by the taperedcylindrical-body-shaped part 12 of the head member 10, is formed into a concave-curved surface, and a bonding surface 22c of the bolt shaft 21, which is friction-welded to the bonding surface 15c, is formed into a convex-curved surface. In this case, a bonding area of the friction welding can be increased, so that bonding strength can be improved.

In this embodiment too, solid-phase diffusion bonding of the members (i.e., the head member 10 and the shaft member 20) performed by friction welding can be appropriately performed, and the locking bolt having prescribed functions and strength can be appropriately produced at low cost. Note that, the shapes of the bonding surface of the projected part, which is formed in the inner bottom part 15 of the head 11, and the bonding surface of the shaft member 20 are not limited as far as the locking bolt has enough functions and strength.

Figure 7:
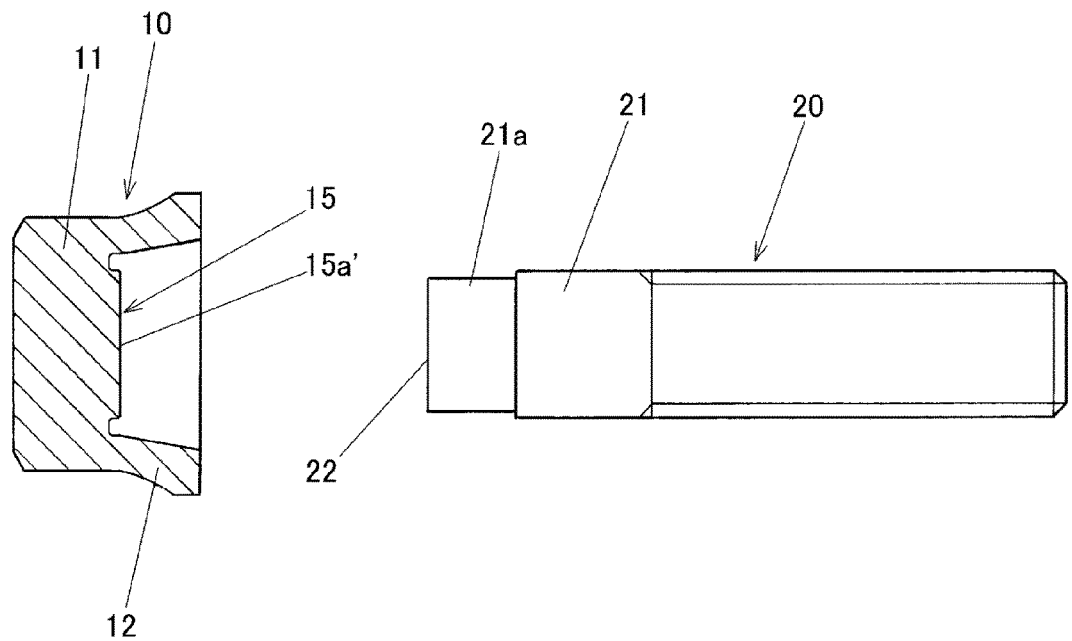
FIG. 7 is a sectional view of the locking bolt relating to the present invention, which explains further production method.
Figure 8:
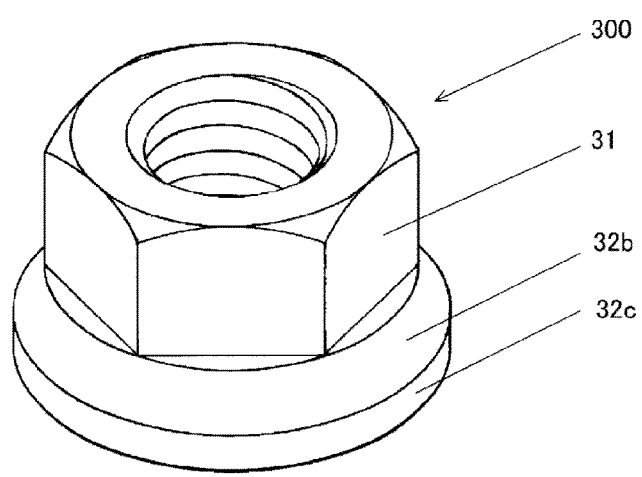
FIG. 8 is a perspective view of a locking nut relating to the present invention.
Figure 9:
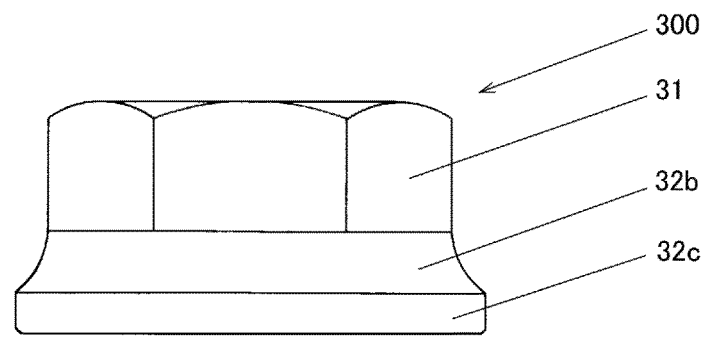
FIG. 9 is a front view of the locking nut relating to the present invention.
Figure 10:
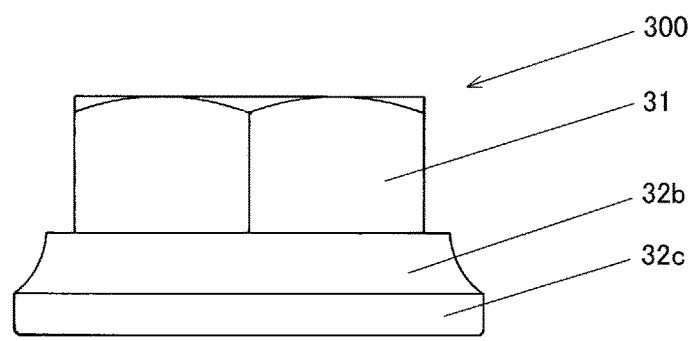
FIG. 10 is a side view of the locking nut relating to the present invention.
Figure 11:
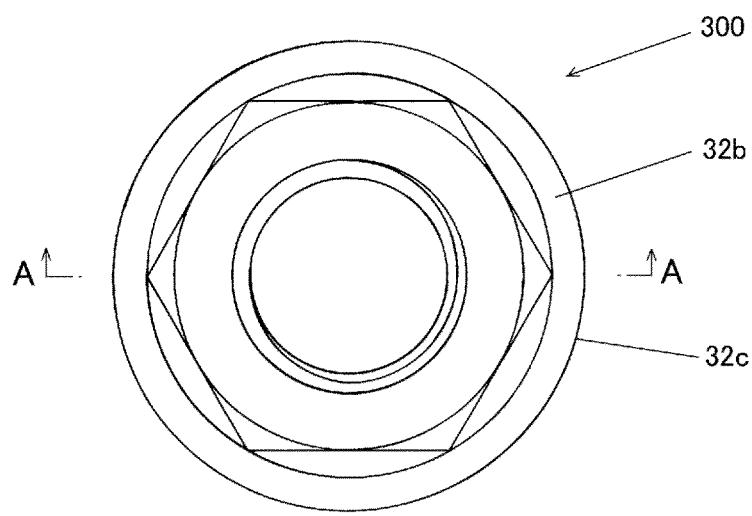
FIG. 11 is a plan view of the locking nut relating to the present invention.
Figure 12:
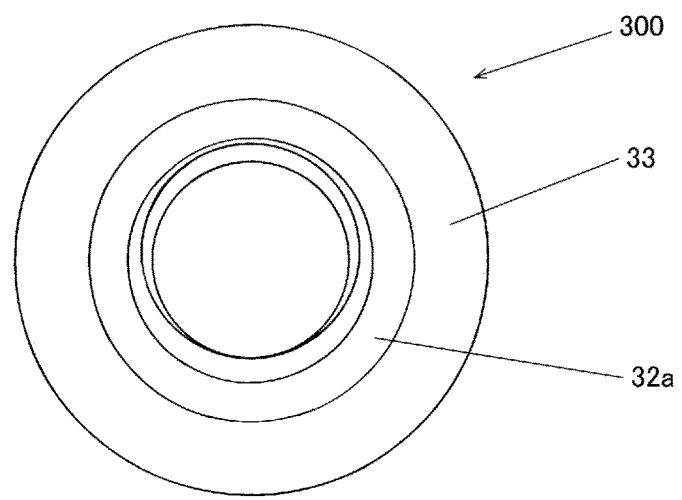
FIG. 12 is a bottom view of the locking nut relating to the present invention.

Further, in an embodiment shown in FIG. 7, an end part 21a of the shaft member 20 on the bonding surface 22 side may be formed thinly. In this case, the protruded part 23 (see FIG. 2) of the friction-welded section 16, which is formed by friction welding, is securely prohibited to contact the inner circumferential surface 12a (see FIG. 1) of the tapered-cylindrical-body-shaped part 12. Therefore, productive efficiency can be improved. Note that, in case that a diameter of the end part 21a is greater than a core diameter of a screw part, the end part 21a does not become a minimum diameter part of the bolt shaft 21, so that enough strength can be secured.

Successively, a preferred embodiment of a locking nut 300 relating to the present invention will be explained with reference to the accompanying drawings (FIGS. 8-13).

In the locking nut 300 too, a shape of a seating surface of a tapered-cylindrical-body-shaped part, which is formed as a flange section, is the same as that of the seating surface 13 of the locking bolt 100.

Namely, the locking nut 300 includes a tapered-cylindrical-body-shaped part 32, which is integrated with a nut head 31 and formed into a cylindrical body shape to enclose a shaft of a bolt, whose diameter is gradually increased and whose end surface 33 is capable of contacting a body 41 being fastened (see FIG. 14) as a seating surface, an inner surface 32a of the tapered-cylindrical-body-shaped part is formed into a cone curved surface, and at least a part of an outer surface of the tapered-cylindrical-body-shaped part is formed into a concave-curved surface 32b.

The outer surface of the tapered-cylindrical-body-shaped part 32 includes the upright surface 32c, which is substantially vertically erected from the body 41 being fastened, and the concave-curved surface 32b, which is continuously formed from the upright surface, a thickness of the tapered-cylindrical-body-shaped part 32 is made equal or gradually increased from a part of the head of the nut where the diameter increase begins to a part where the concave-curved surface 32b and the upright surface 32c are connected, and the thickness between the concave-curved surface 32b and the upright surface 33 is determined, according to an erection length of the upright surface 32c, so as to receive a tightening force of the nut and an impact and vibration from the body being fastened without being plastic-deformed. In the present embodiment, the erection length (thickness) is equal to or greater than a thickness of a standard plain washer which meets Japanese Industrial Standards.

In the locking nut 300, strength of a peripheral edge part of the tapered-cylindrical-body-shaped part 32 on the seating surface 33 side can be appropriately secured. If a size of the upright surface 32c is equal to or greater than a thickness of a washer, enough strength can be obtained. Namely, a thick portion enclosed by the upright surface 32c and the inner circumferential surface 32a can receive impact or vibration applied from the body 41 being fastened to the seating surface 33 without being plastic-deformed. Further, the received impact or vibration is conducted to the concave-curved surface 32b, which is continuously formed from the upright surface 32c, and bends the concave-curved surface 32b. Therefore, turning the locking nut 300 is restrained, so that loose of the locking nut can be prevented. Namely, the tapered-cylindrical-body-shaped part 32 is appropriately plastic-deformed by a tightening force, elastic stress generated by the plastic deformation absorbs the impact and vibration, so that loose of the locking nut can be appropriately prevented. The thick portion between the upright surface 32c and the inner circumferential surface 32b acts like a washer and prevents loose of the locking nut, and external dimensions can be appropriately reduced.

Figure 14:
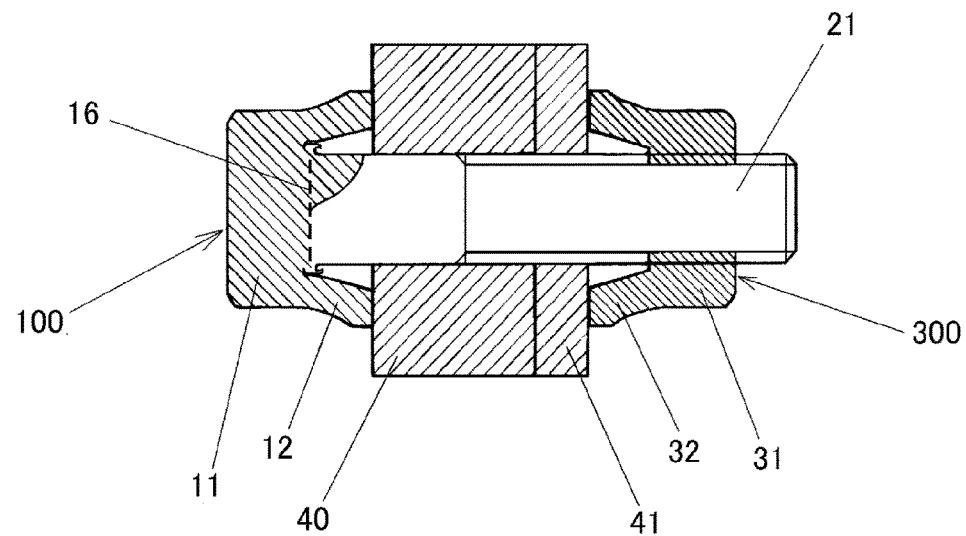
FIG. 14 is an explanation view, in which a body being fastened is fixed by the locking bolt and the locking nut relating to the present invention.

In FIG. 14, the bodies 40 and 41 being fastened are fastened by the locking bolt 100 and the locking nut 300. The locking nut 300 is screwed with the bolt shaft, so that the bodies 40 and 41 can be solidly fastened by the bolt and nut.

Figure 15:
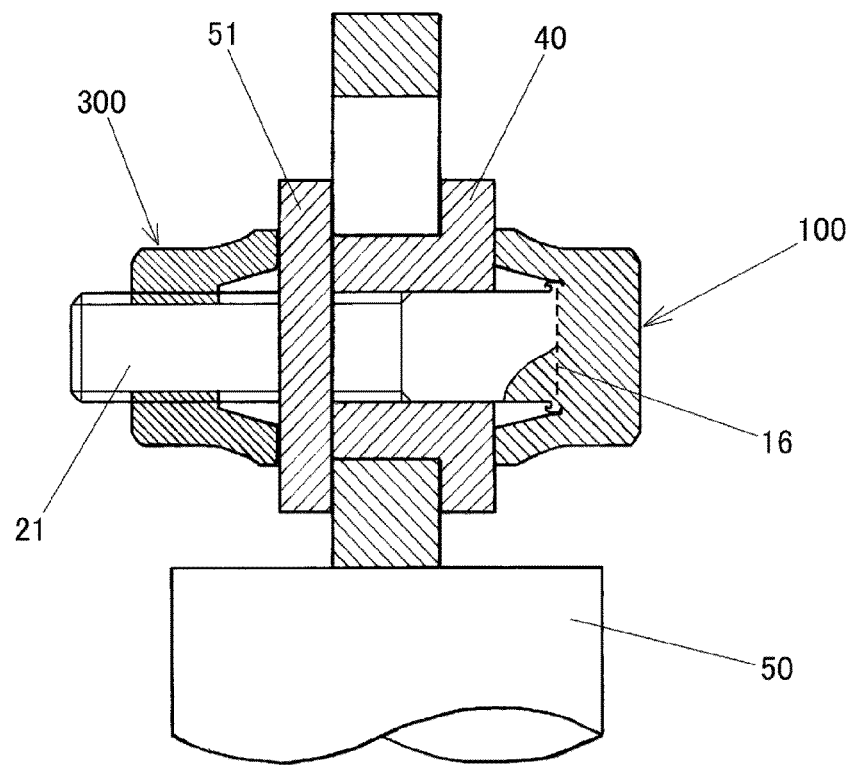
FIG. 15 is a sectional view showing a method for a screw loosening test of the locking bolt and the locking nut relating to the present invention.
Figure 16:
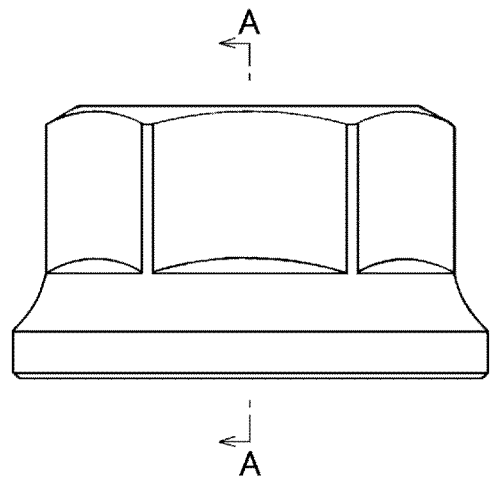
FIG. 16 is a front view of the locking nut of another embodiment relating to the present invention.
Figure 17:
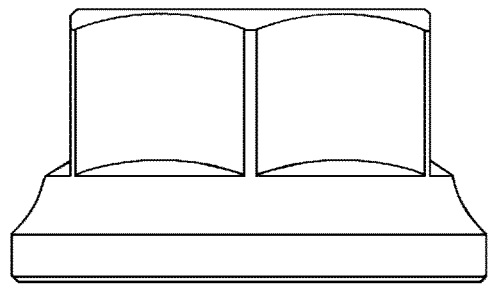
FIG. 17 is a side view of the locking nut shown in FIG. 16.
Figure 18:
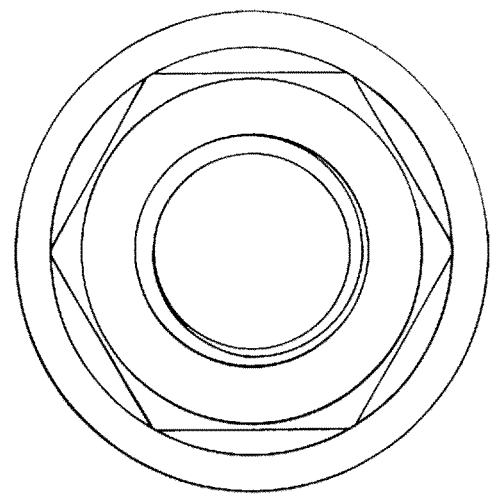
FIG. 18 is a plan view of the locking nut shown in FIG. 16.
Figure 19:
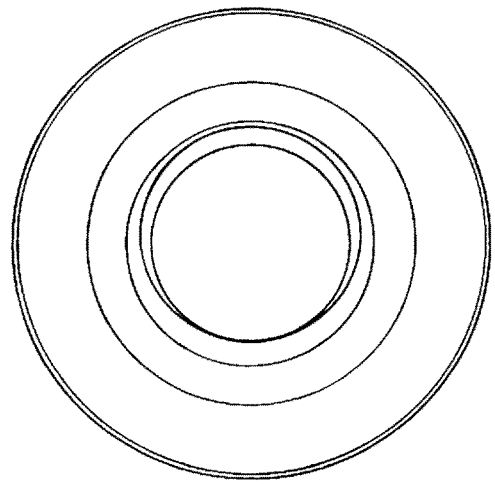
FIG. 19 is a bottom view of the locking nut shown in FIG. 16.
Figure 20:
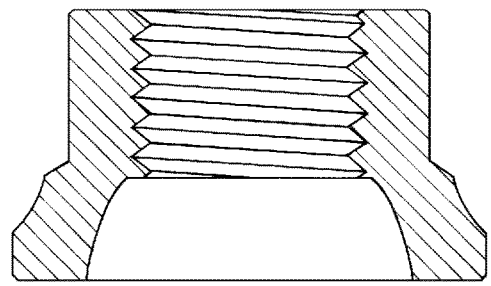
FIG. 20 is a sectional view of the locking nut shown in FIG. 16 taken along a line A-A.
Figure 21:
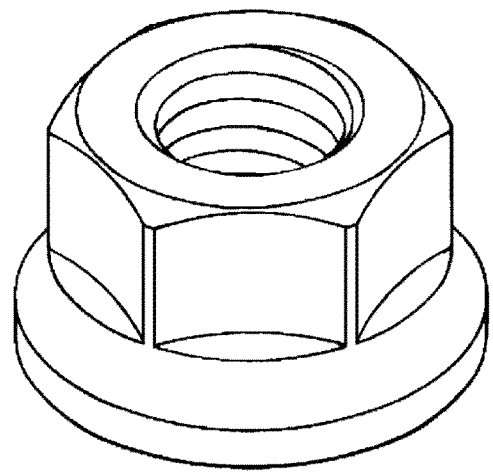
FIG. 21 is a perspective view of the locking nut shown in FIG. 16.
Figure 22:
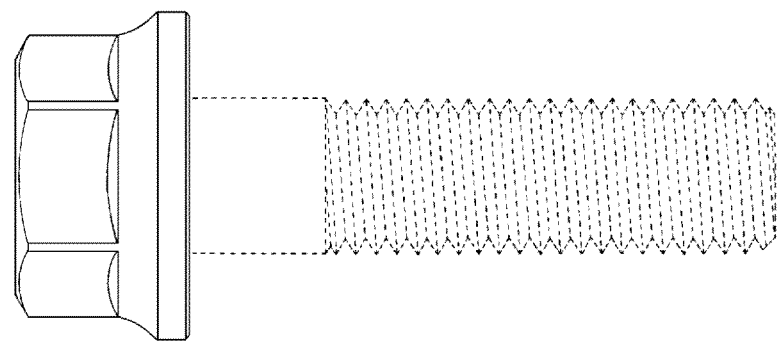
FIG. 22 is a front view of the locking bolt of another embodiment relating to the present invention.
Figure 23:
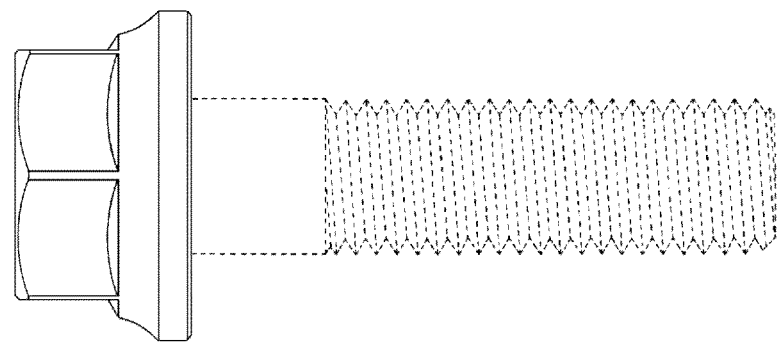
FIG. 23 is a side view of the locking bolt shown in FIG. 22.
Figure 24:
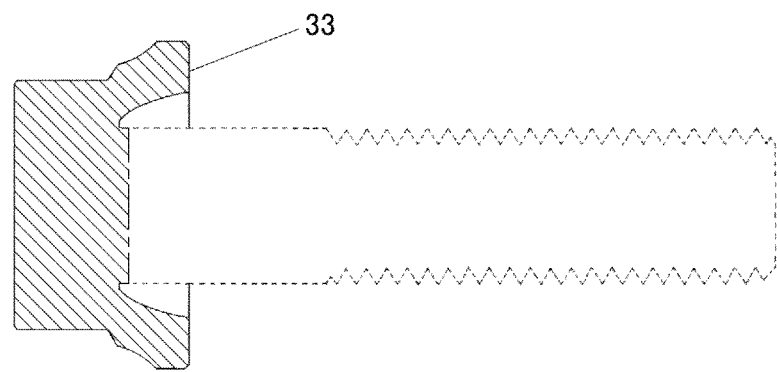
FIG. 24 is a sectional view of the locking bolt shown in FIG. 22.
Figure 25:
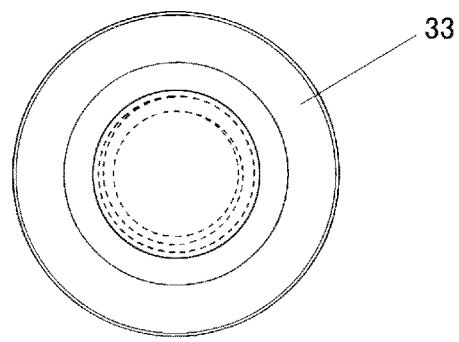
FIG. 25 is a bottom view of the locking bolt shown in FIG. 22.

Next, results of a loose test of the locking bolt 100, which was produced by the method relating to the present invention, will be explained with reference to FIG. 15.

A vibration barbell (the body 40 being fastened), which was set on a vibrator base 50 of a high speed screw-loose-testing apparatus, is tightly fastened, by test samples of the locking bolt 100 and the locking nut 300, with a washer 51. Screws of M10, M12 and M16 were respectively tested by applying a prescribed tightening force thereto according to JIS.

In the test, the high speed screw-loose-testing apparatus applied vibration of 1780 rpm, a stroke of the vibrator base was 19 mm, a direction of vibration was a direction perpendicular to the bolt shaft, the test was performed for up to 17 minutes, and time to loose for each of the screws was measured.

In the test, vibration was applied to all of the bolts M10, M12 and M16 for the maximum period of 17 minutes, but no bolts were loosened.

The high speed screw-loose-testing apparatus repeatedly applies vibration and impact at high speed, so conventional bolts and nuts are loosened in several seconds to several tens of seconds. Further, even in a double-nut fastening member whose tightening force is highest among commercially available fastening members, time to loose is several minutes. But, in the test, the locking bolt 100 and the locking nut 300 of the present invention could maintain tightening force for 17 minutes, so it was confirmed that the locking bolt and the locking nut have highest performances.

Next, the inner circumferential surface 12a of the tapered-cylindrical-body-shaped part 12 will be explained. FIGS. 16-21 show embodiments of the locking nut whose inner circumferential surface 12a of the tapered-cylindrical-body-shaped part 12 is formed into the concave-curved surface. As shown in FIGS. 22-25, the shape of the inner circumferential surface 12a of the tapered-cylindrical-body-shaped part 12 may be applied to the shape of the head member 10 of the locking bolt.

The shape of the concave-curved surface of the inner circumferential surface 12a of the tapered-cylindrical-body-shaped part 12 is not limited to the arc-like concave surface in which a section is constituted by a part of a circular curve, so a part of an inverted catenary curve, which is a curve (catenary curve) inverted upside down, or a part of a spline curve, for example, may be applied to the concave-curved surface.

Since the inner circumferential surface 12a of the tapered-cylindrical-body-shaped part 12 is the concave-curved surface, the entire seating surface, which is the end surface of the tapered-cylindrical-body-shaped part 12, is capable of highly uniformly pressing against the body being fastened. Namely, tightening force generated by the bolt and the nut is uniformly dispersed and converted into pressure evenly applied to the body being fastened, so that the entire seating surfaces effectively prevent the loose. Therefore, locking performance can be improved.

Figure 13:
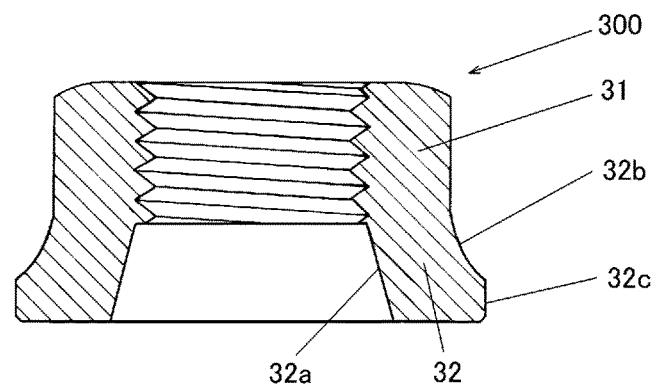
FIG. 13 is a sectional view of the locking nut relating to the present invention taken along a line A-A.

Further, in the fastening member such as the locking bolt, the taper angle of the tapered-cylindrical-body-shaped part 32 is an acute angle, and the upright surface 32c is formed in the outer circumferential surface of the tapered-cylindrical-body-shaped part 32 and vertically erected from the body 41 being fastened, so that an outer diameter of the circular-planar-band-ring-shaped seating surface 33 has a size in a range for creating a surface pressure from the seating surface 33 so as to effectively press against the body 41 being fastened, as well as the locking nut shown in FIG. 13. With this structure, the diameter of the seating surface 33 can be appropriately reduced without decreasing the locking function.

In the conventional fastening member, tightening force is converted into surface pressure, and the surface pressure tends to concentrate to only an inner edge part of a seating surface of the fastening member. On the other hand, in the fastening member of the present invention which has the tapered-cylindrical-body-shaped part, the surface pressure can be generated in the entire seating surface and the tightening force can be evenly dispersed. Further, the locking effect can be increased by the function of the tapered-cylindrical-body-shaped part. However, in case of using the tapered-cylindrical-body-shaped part too, the surface pressure is gradually reduced toward the outer periphery of the seating surface, and no surface pressure is applied in an outer part located on the outer side of a prescribed position. Therefore, the seating surface need not be formed on the outer side of the prescribed position (zero point) from which no surface pressure is applied, the size (diameter) of the seating surface can be determined on the basis of the zero point. In this case, the outer diameter of the seating surface can be appropriately determined, and the fastening member of the present invention can be downsized.

Figure 26:
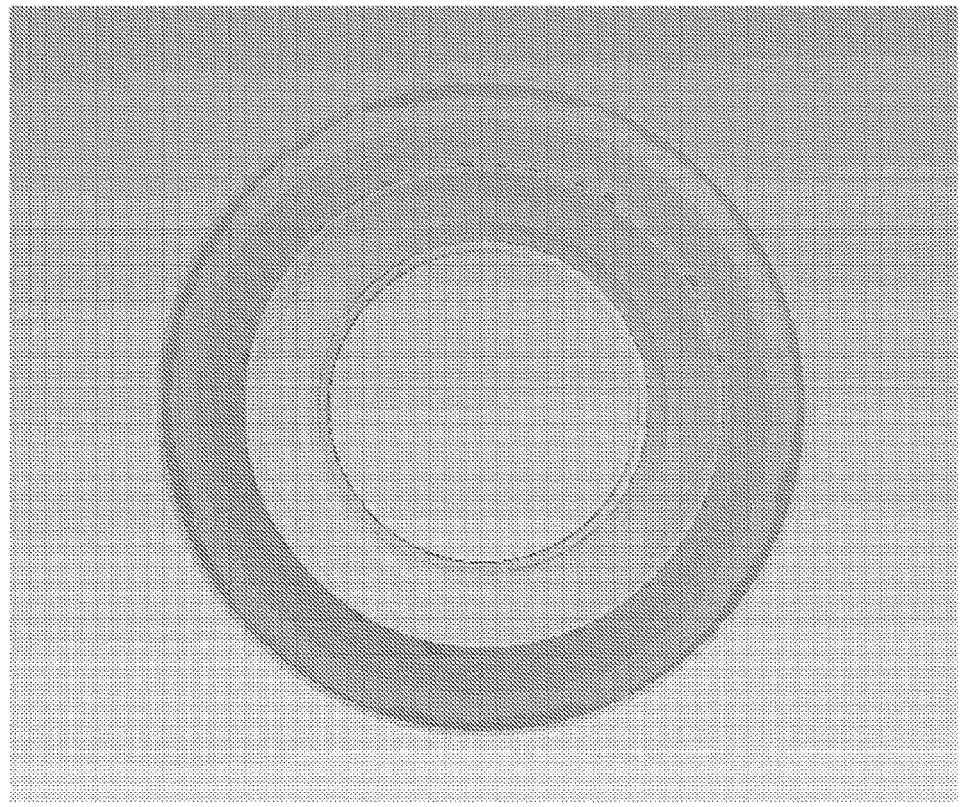
FIG. 26 is an analysis chart of surface pressure applied to a seating surface of the locking bolt relating to the present invention.
Figure 27:
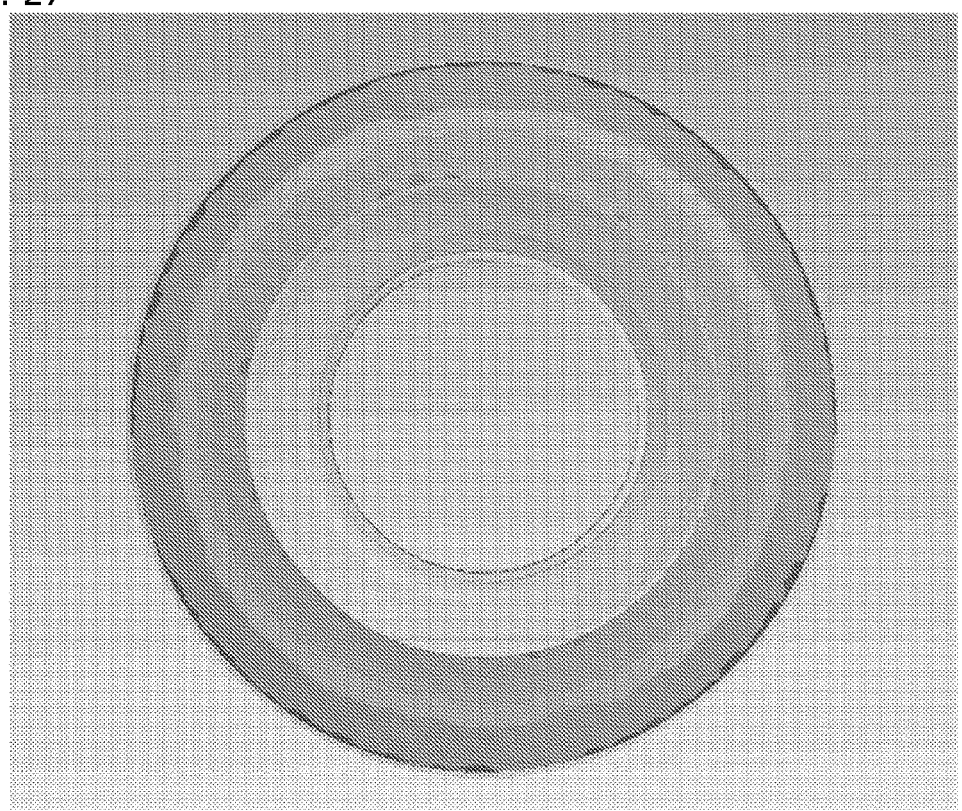
FIG. 27 is an analysis chart of surface pressure applied to a seating surface of a locking bolt of a comparative example.

As to the above described effects, analysis results of the surface pressure applied to the seating surfaces 33 of the locking bolts shown in FIGS. 22-25 will be explained. FIG. 26 shows the analysis result of the surface pressure of the bolt M10 whose seating surface had a suitable outer diameter of 20 mm, and FIG. 27 shows the analysis result of the surface pressure of the bolt M10 whose seating surface had an outer diameter of 22 mm.

Figure 28:
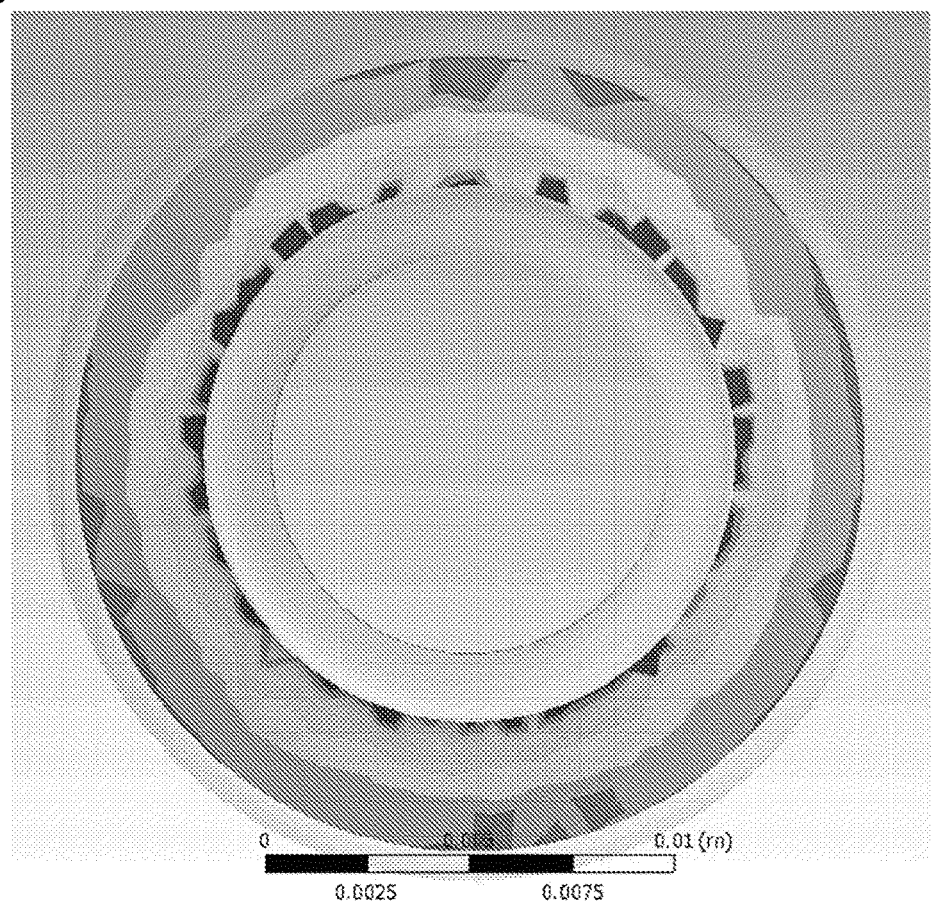
FIG. 28 is an analysis chart of surface pressure applied to a seating surface of a conventional hexagon bolt having a flange.

In case of the seating surface having the suitable diameter shown in FIG. 26, when a load (axial load) applied to the bolt shaft was 33700 N, vertical stress (surface pressure) applied to the seating surface 33 was maximum of $5.9 \times 10^8$ Pa in an inner edge part, the vertical stress was gradually reduced toward an outer edge part as shown by a graduated gray image, and the vertical stress was minimum of $4.3 \times 10^7$ Pa in an outer edge part. On the other hand, in case of the embodiment shown in FIG. 27, when the same load was applied, vertical stress applied to the seating surface 33 was maximum of $6.1 \times 10^8$ Pa in an inner edge part, the vertical stress was gradually reduced toward an outer edge part, and the surface pressure was zero, i.e., floating state, in an outer edge part where a gray image was darkest. Similarly, in case of a commercially available hexagon bolt M10 having a flange whose diameter is 20 mm (e.g., JIS B1189U seating surface-type bolt), a surface pressure applied was maximum of $2.5 \times 10^9$ Pa in an inner edge part, and a floating state was widely caused in an outer edge part, so the surface pressure was unevenly applied in comparison with the present invention (see FIG. 28).

Successively, embodiments of a washer having the tapered-cylindrical-body-shaped part 12 whose inner circumferential surface 12a is a concave-curved surface will be explained with reference to FIGS. 29-34. By employing the tapered-cylindrical-body-shaped part 12 whose inner circumferential surface 12a is the concave-curved surface, the washer has the locking function as well as the above described locking bolts and the locking nuts.

The washer is employed for fastening a body being fastened by a screw tightening action and used together with a bolt and a nut, and the washer has a tapered-cylindrical-body-shaped part, which is formed into a cylindrical body shape with a gradually increasing diameter toward a seating surface formed into a circular-planar-band-ring-shape concentric with an axis.

In case of fastening the body being fastened by the screw tightening action of the fastening member such as a bolt and a nut, the washer having a superior locking function is set between the fastening member and the body being fastened, and the washer comprises: the tapered-cylindrical-body-shaped part 12, which is formed into a cylindrical body shape with a gradually increasing diameter from a surface 60 being pressed (see FIG. 34), on which the seating surface of the fastening member will be pressed, toward a washer seating surface 13, which will press against the body being fastened; and a plurality of bosses 61, which are formed in the surface being pressed and capable of preventing the fastening member from corotation.

Figure 29:
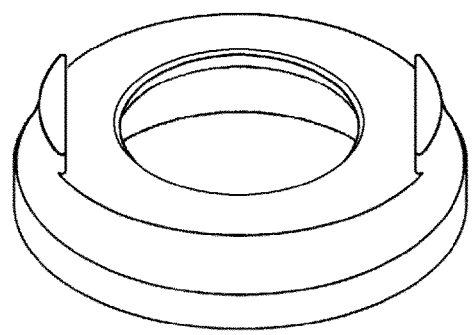
FIG. 29 is a perspective view of a locking washer relating to the present invention.
Figure 30:
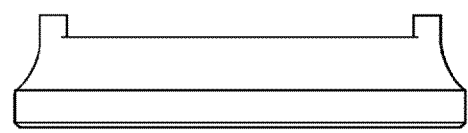
FIG. 30 is a front view of the locking washer shown in FIG. 26.

The shape of the bosses is not limited to the shape shown in FIG. 29, whose inner side surfaces are flat surfaces corresponding to a head of a hexagon bolt or nut, so various shapes can be employed as far as corotation of the fastening member can be prevented. For example, three bosses 61 shown in FIG. 29 may be equally arranged in the circumferential direction, and each of the bosses may be divided into a plurality of sections.

An upper edge (inner edge) of a through-hole 62 of the washer is chamfered to form a chamfered part 63, so that a shaft of a bolt can be inserted and appropriately fitted without interfering with a rounded part which is continuously formed from a bolt head to the shaft thereof. As to the inner edge having the chamfered part 63, a thickness between the surface 60 being pressed and the inner circumferential surface 12a can be thinner, the inner diameter can be determined to perform centering the bolt, and the shape can be corresponded to that of the bolt.

Figure 35:
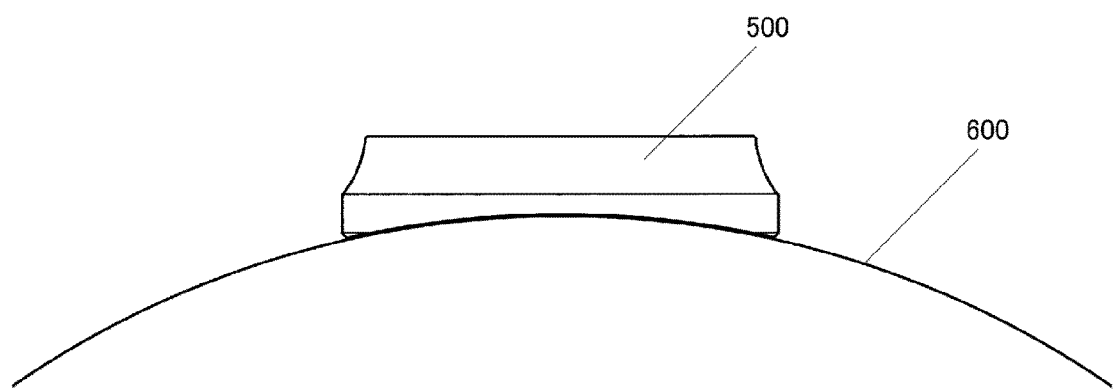
FIG. 35 is a front view of the locking washer of another embodiment relating to the present invention in a use state.

A locking washer 500, whose seating surface is formed into a curved surface so as to fit on an outer circumferential surface 600 of, for example, a columnar body or a pipe, is shown in FIG. 35.

The locking washer 500 can be appropriately set between the circumferential surface 600 and the bolt or nut instead of a conventional spacer. Therefore, the superior locking function can be obtained as well as the above described fastening members.

The preferred embodiments of the present invention have been described in detail, it should be understood that the various changes, substitutions, and alternations could be made hereto without departing from the spirit and scope of the invention.

EXPLANATION OF REFERENCE SYMBOLS

10 The head member
11 The bolt head

12 The tapered-cylindrical-body-shaped-part
12a The inner circumferential surface
12b The outer circumferential surface
13 The seating surface
15 The inner bottom part
15a The projected part
15a' The bonding surface
15b The outer circumferential surface
15c The bonding surface
16 The friction-welded section
20 The shaft member
21 The bolt shaft
22 The bonding surface
22c The bonding surface
23 The protruded part
31 The nut head
32 The tapered-cylindrical-body-shaped-part
32a The inner circumferential surface
32b The outer circumferential surface
33 The seating surface
40 The body being fastened
50 The vibrator base
60 The surface being pressed
61 The bosses
62 The through-hole of the washer
63 The chamfered part
100 The locking bolt
300 The locking nut
500 The locking washer
600 The circumferential surface

The invention claimed is:

1. A fastening member which is one of a bolt, a nut or a washer employed for fastening a body being fastened by a screw tightening action, the fastening member having a tapered-ring-body-shaped part, which is formed into a ring body shape with a gradually increasing diameter toward a seating surface formed into a circular-planar-band-ring-shape concentric with an axis so as to press against the body being fastened,
   wherein the taper angle of the tapered-ring-body-shaped part is an acute angle, and
   an upright surface is formed in an outer circumferential surface of the tapered-ring-body-shape part and vertically erected from the body being fastened, so that an outer diameter of the circular-planar-band-ring-shaped seating surface has a size in a range for creating a surface pressure from the seating surface so as to effectively press against the body being fastened,
   an inner circumferential surface of the tapered-ring-body-shaped part includes a concave-curved surface.

2. The fastening member according to claim 1, wherein the outer circumferential surface of the tapered-ring-body-shaped part includes the upright surface and a concave-curved surface, which is continuously formed from the upright surface,
   a thickness of the tapered-ring-body-shaped part is made entirely equal or gradually increased from a part where the diameter increase begins to a part where the concave-curved surface and the upright surface are connected, and
   the thickness between the concave-curved surface and the upright surface is determined, according to an erection length of the upright surface, so as to receive a tightening force of a bolt and an impact and vibration from the body being fastened without being plastic-deformed.

3. A locking bolt comprising a tapered-ring-body-shaped part, which is integrated with a bolt head and concentrically encloses a bolt shaft and whose diameter is gradually increased, the tapered-ring-body-shaped part having an end surface, which acts as a seating surface formed into a circular-planar-band-ring-shape concentric with an axis of the bolt shaft and which contacts a body being fastened,
   wherein a head member of the locking bolt is constituted by the bolt head and the tapered-ring-body-shaped part,
   a short-columnar-projected part is formed in an inner bottom part of the bolt head, which is enclosed by the tapered-ring-body-shaped part and the short-columnar-projected part has an end surface acting as a bonding surface of friction welding,
   a protruded part of a friction-welded section of the short-columnar-projected part, which is protruded by the friction welding can be accommodated in a space between an outer circumferential surface of the projected part and the inner circumferential surface of the tapered-ring-body-shaped part;
   a shaft member of the locking bolt is bonded to the head member by the friction welding; and
   the friction-welded section is annealed.

4. The locking bolt according to claim 3, wherein the bonding surface of the projected part formed in the inner bottom part of the bolt head and a bonding surface of the bolt shaft are formed into a same shape.

5. The locking bolt according to claim 3, wherein a taper angle of the tapered-ring-body-shaped part is an acute angle, and
   an upright surface is formed in an outer circumferential surface of the tapered-ring-body-shaped part and vertically erected from the body being fastened, so that an outer diameter of the circular-planar-band-ring-shaped seating surface has a size in a range for creating a surface pressure from the seating surface so as to effectively press against the body being fastened.

6. The locking bolt according to claim 3, wherein the outer circumferential surface of the tapered-ring-body-shaped part includes the upright surface and a concave-curved surface, which is continuously formed from the upright surface,
   a thickness of the tapered-ring-body-shaped part is made entirely equal or gradually increased from a part the bolt head where the diameter increase begins to a part where the concave-curved surface and the upright surface are connected, and
   the thickness between the concave-curved surface and the upright surface is determined, according to an erection length of the upright surface, so as to receive a tightening force of the bolt and an impact and vibration from the body being fastened without being plastic-deformed.

7. The locking bolt according to claim 3,
   wherein an inner circumferential surface of the tapered-ring-body-shaped part includes a concave-curved surface.

* * * * *